J. T. McCUNE.
HAY PRESS.
APPLICATION FILED MAY 2, 1914.
1,139,046.
Patented May 11, 1915.
2 SHEETS—SHEET 1.
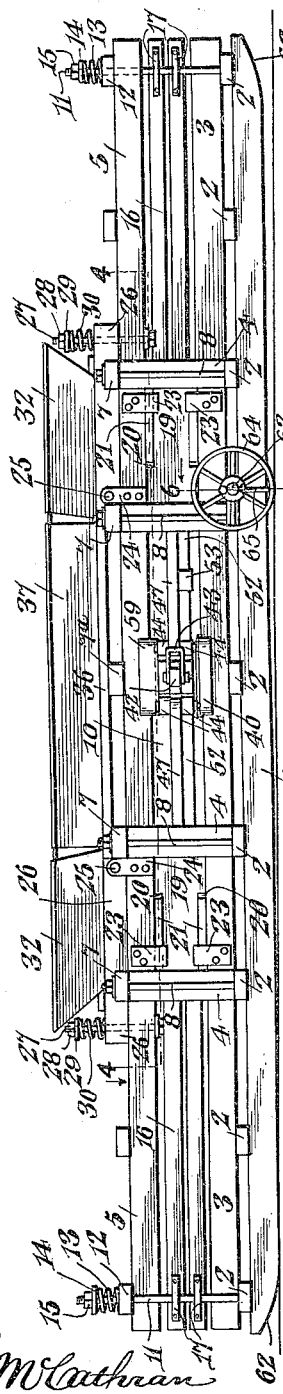
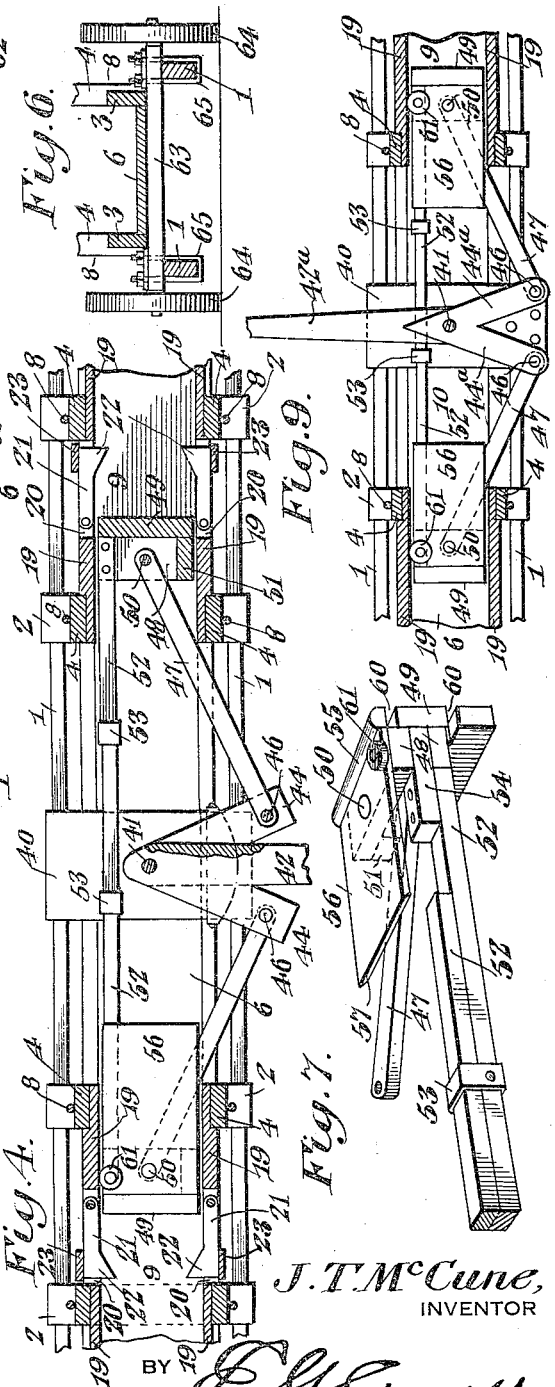
J. T. McCune,
INVENTOR
WITNESSES

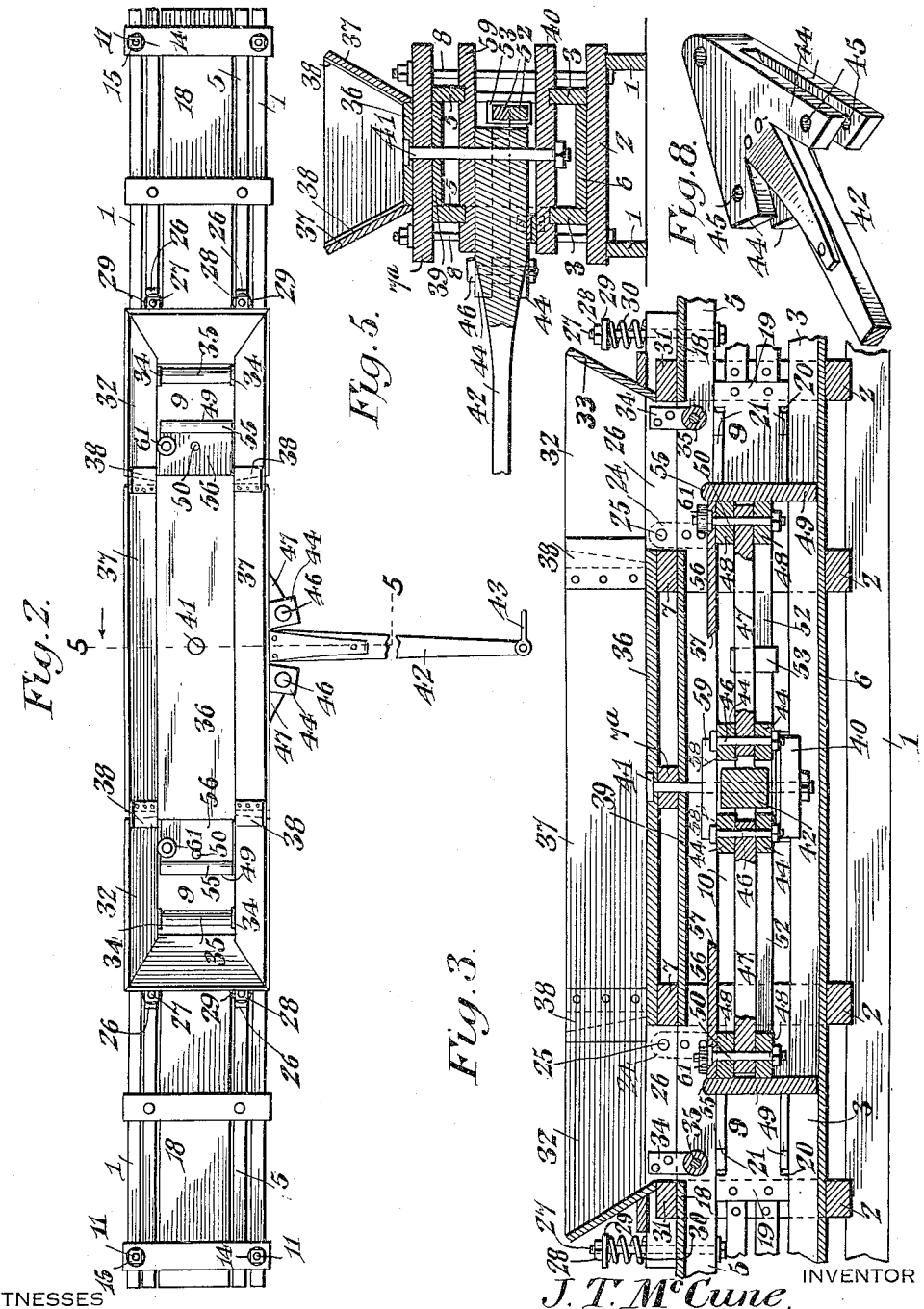

UNITED STATES PATENT OFFICE.

JOHN THOMAS McCUNE, OF DECATUR, MISSISSIPPI.

HAY-PRESS.

1,139,046.  Specification of Letters Patent.  Patented May 11, 1915.

Application filed May 2, 1914. Serial No. 835,934.

*To all whom it may concern:*

Be it known that I, JOHN T. McCUNE, a citizen of the United States, residing at Decatur, in the county of Newton and State of Mississippi, have invented a new and useful Hay-Press, of which the following is a specification.

This invention has reference to improvements in hay presses, and its object is to provide a press which may be moved from place to place with ease, and which may be operated with a relatively small expenditure of power, and whereby the hay to be pressed may be readily and rapidly fed to the baling chambers.

In accordance with the present invention two spaced baling chambers are provided with plungers arranged to reciprocate between the chambers under the impulse of an actuating lever moved to and fro on one side of the press, thus in no way interfering with the presence of attendants and the hay to be baled on the other side of the press. In order to facilitate the feeding of the hay to the baling chambers, an elongated hopper is provided allowing free communication between the mouths of the baling chambers so that there may be kept at all times an ample supply of hay on the machine for introduction into the baling chambers in alternation, thus avoiding delays in the operation of the press which would otherwise occur from an insufficient supply of hay.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of a baling press embodying the present invention. Fig. 2 is a plan view thereof. Fig. 3 is a longitudinal central vertical section through the baling chambers. Fig. 4 is a section on the line 4—4 of Fig. 1. Fig. 5 is a section on the line 5—5 of Fig. 2. Fig. 6 is a section on the line 6—6 of Fig. 1 but drawn on a larger scale. Fig. 7 is a perspective view of one of the baling heads or plungers. Fig. 8 is a perspective view of the pivoted end of the sweep for operating the plungers. Fig. 9 is a section similar to Fig. 4 but showing another type of sweep.

Referring to the drawings, there are shown two runners 1 carrying cross pieces 2 upon which are mounted sills 3, the latter being connected by uprights 4 to longitudinal beams 5 in length and location corresponding to the sills 3. The sills 3 and beams 5 define a press box which is supplied with flooring 6. The posts 4 are surmounted by cross pieces 7 connected to the corresponding cross pieces 2 by bolts 8. The posts 4 are arranged in pairs with the posts of each pair spaced apart to define a baling chamber 9, there being two such baling chambers separated by a portion 10 of the main frame of the machine which may be considered as the sweep and plunger chamber. The extreme ends of the sills 3 and corresponding beams 5 are connected together by bolts 11 traversing appropriate ones of the cross pieces 2 and other cross pieces 12 carried by the outer ends of the beams, the bolts 11 being surrounded by springs 13 above the cross pieces 12 and held at any appropriate degree of tension by washers 14 and nuts 15 as is customary. Between the sills 3 and beams 5 in the spaces between the end cross pieces 7 of the baling chambers and the cross pieces 12 are slats 16 forming the sides of the compression and discharge ends of the baling chambers, the bolts 11 extending through guiding eyes or blocks 17 on the outer ends of the slats 16. Each compression chamber is provided with a cover portion 18 as is customary, and each baling chamber has side walls 19 made fast between the corresponding posts 4. These walls 19 are in the form of boards, and such boards are suitably recessed as shown at 20 for the reception of dogs 21 having nose ends 22 entering the baling chambers at their discharge ends to prevent return of compressed material. The dogs 21 are maintained yieldably with the nose ends within the compression chambers by spring retaining plates 23, or in any other suitable manner.

Carried by each beam 5 near the inner end of the baling chamber is a bracket 24 rising above the beam and there connected by a pivot pin 25 to one end of a bar 26 normally resting on the beam 5 and at the end remote from the pivot having a guide bolt 27 extending therethrough, the bolt being carried by a corresponding portion of the beam 5. This bolt is provided with the usual nut 28 and washer 29 between which and the bar 26 there is interposed a spring 30 tending to maintain the bar against the beam 5, but yieldable to a superior force to permit the bar 26 to turn on the pivot 25. The bars 26 joined near their yieldable ends by a cross strip 31 form a hopper frame carrying side members 32 and one end member 33 of a hopper section opening freely into the corresponding baling chamber 9. Near the cross bar 31 each side member or bar 26 of the hopper section carries a depending bracket 34, and mounted in the two brackets is a roller 35 normally lodged within the upper portion of the corresponding baling chamber.

Fast to the cross bars 7 at the adjacent ends of the two baling chambers and to another cross bar 7ª intermediate of the said bars 7 is a flooring 36 carrying flaring side portions 37 forming the sides of a connecting extension of the hopper sections immediately over the baling chambers and the joints between the side members 32 and the side members 37 are covered by plates 38 carried by the side members 37, so that the hopper sections leading directly into the baling chambers may yield about the pivot supports of the hoppers without opening the sides of the extended hopper made up of the end members and intermediate member.

On the under sides of the cross piece 7 and 7ª carrying the flooring 36 is a cover board 39 on a line with the cover member 18 of the compression end of the baling chambers.

Mounted on the sills 3 and extending crosswise thereof about midway of their length and within the sweep chamber 10 is a board 40 and extending through this board as well as through the cross piece 7ª is a pivot pin or bolt 41 constituting a pivot support for one end of a sweep 42 extending laterally outward through one side of the baling press. This sweep is provided at the outer end with a connecting link 43 for the attachment of draft animals in such manner that the sweep may be rocked about a vertical pivot represented by the bolt 41 through an arc of suitable degree for the purposes of the invention.

At the pivoted end of the sweep 42 there are arranged divergent arms 44 which may be in the form of castings or forgings made fast to the main portion of the sweep 42 or may be otherwise arranged. The arms 44 are formed in pairs on opposite sides of the longitudinal center line of the sweep, and at their outer or divergent ends have matching perforations 45 for pivot pins 46 each extending through one end of a corresponding link 47, the other end of which is introduced between ears 48 projecting from the rear face of a plunger or follower head 49, and is connected to these ears by a pivot pin 50. The ears 48 are shown as being as wide as the plunger head and at one end these ears are separated by a spacing block 51, while at the other side of the plunger head there is secured an elongated bar 52 which at an intermediate point carries a closed strap 53 designed to receive and guide the corresponding bar 52 of the plunger head, it being understood that two such plunger heads are employed, and the bars 52 are slidably connected together by respective straps 53. Since the bars 52 slide one on the other, one of them may be secured directly between the ears 48, while the other is made fast to a block 54 similarly secured between the ears 48, this last arrangement being best indicated in Fig. 7.

The plunger head has its upper edge 55 slightly rounded and extending backwardly from the active face of the plunger head is a board 56 moving between the beams 5 and serving to steadily guide the plunger head. That edge of the board 56 remote from the head 49 is beveled as indicated at 57, and is movable into and out of engagement with similarly beveled portions 58 of a cross board 59 carried by the beams 5 and traversed by the pivot bolt 41.

The head 49 is provided with the usual recesses 60 for baling wires, and on that side of the head remote from the sweep 42 anti-friction rollers 61 are provided to take up the thrust of the link 47.

In the structure shown in Figs. 1 to 8 the sweep has a pivot pin 41 at its extreme end and the pivot connections 46 with the links 47 spaced from the pivot at an appropriate distance toward the outer end of the sweep where the power is applied through the link 43. In Fig. 9 a sweep 42ª is provided with divergent arms 44ª extending from the pivot support represented by the bolt 41 in a direction away from the outer end of the sweep 42ª, so that the sweep in the structure of Fig. 9 becomes a lever of the first order. Otherwise the structure of Fig. 9 is like that of the other figures. The only difference between the two forms of sweep is that in one form, say that of Fig. 1 and associated figures, the outer end of the sweep moves in the same direction as the working plunger, while in the structure of Fig. 9 the outer end of the sweep moves in the opposite direction to that of the working plunger.

The runners 1 have the lower edges upturned at the ends as shown at 62, so that the runners serve as skids for the transportation of the device from place to place. To facilitate the transportation of the press from place to place there is provided an axle 63 having wheels 64 on the ends and clips 65 are also provided for securing the axle to the runners 1 to one side of the middle of the runners, so that one end of the structure is somewhat elevated and is supported on the wheels 64 while the other end drags upon the ground. By attaching a draft animal to the elevated end of the structure the whole press may be readily drawn from place to place, and when located the axle 63 with the wheels 64 is readily removed, thus permitting the press to rest wholly upon the runners and the friction is usually sufficient to prevent displacement of the press during operation, but small stakes driven into the ground at the ends of the runners will be found sufficient to hold the press in place even under heavy service.

As the plungers are reciprocated there is a side thrust caused by the side displacement of the links 47, which links, together with the arms 44, serve as toggle devices driven by the sweep 42, but during a material portion of the travel of the plungers the side thrust is considerable, but this side thrust is taken up by the rollers 61 and undue friction is not present. The arrangement of the sweep with the links 47 is such that the power on the power stroke is greatly augmented as the resistance to the movement of the plunger becomes greater while the withdrawal of the plunger is rapid. The two plungers are steadied in their travel by the connected bars 52 which because they slide one upon the other permit the variations in speed of travel of the two plungers. Although these two plungers travel simultaneously in the same direction their rate of travel varies because of the divergence of the arms 44.

When a plunger is withdrawn from the baling chamber hay is introduced thereinto in suitable quantity, the elongated hopper providing always an ample supply. When the plunger moves forwardly on its pressure stroke the rounded upper edge 55 of the plunger head ultimately comes into engagement with the roller 35 and underriding the latter elevates the hopper section carrying the roller while the rounded edge 55 and the roller serve as a cut-off for the hay. The dogs 21 prevent return of the compressed hay into the baling chamber, and consequently on the withdrawal of the plunger the baling chamber is left empty for recharging. In this last respect the baling press of the invention corresponds with other baling presses, and as the action beyond the baling chamber is similar to other baling presses no description thereof is deemed necessary.

The employment of a rocking sweep permits the location of the draft animals on one side of the press, while the operator and the hay may be located on the other side of the press, each being out of the way of the other, while experience has shown that the press of the present invention is both efficient and rapid in operation.

What is claimed is:—

1. A baling press provided with a frame including longitudinally arranged sills and beams with the latter above and spaced from the sills, baling chambers spaced apart in the direction of the length of the press, a plunger in each baling chamber, a sweep pivotally mounted intermediate of the baling chambers between the sills and beams and provided at the pivoted end with divergent arms directly on and fast to said sweep and located on opposite sides thereof, and links each connecting a respective one of the divergent arms to a respective plunger.

2. A baling press provided with baling chambers spaced apart in the direction of the longitudinal axis of the press, reciprocable followers, one for each baling chamber, said followers having sliding connections between them, and means for actuating the followers.

3. A baling press provided with baling chambers spaced apart in the direction of the longitudinal axis of the press, reciprocable followers one for each baling chamber, sliding connections between the followers, a sweep pivoted in the baling press between the followers and provided with arms diverging from the pivoted support, the sweep and arms being located in the longitudinal center line of the press and movable in a plane intermediate of the tops and bottoms of the baling chambers of the press, and link connections between the outer ends of the arms and the respective followers.

4. A baling press provided with baling chambers spaced apart in the direction of the longitudinal axis of the press, reciprocable followers one for each baling chamber, said followers having sliding connections between them, a sweep pivoted in the baling press between the followers and provided with arms diverging away from the pivoted support, and link connections between the outer ends of the arms and the respective followers.

5. A baling press provided with baling chambers spaced apart in the direction of the longitudinal axis of the press, reciprocable followers one for each baling chamber, said followers having sliding connections between them, a sweep pivoted in the baling press between the followers and provided with arms diverging away from the pivoted support, and link connections between the outer ends of the arms and the respective followers, each follower being provided with anti-friction thrust bearings on the side of the center line of the press remote from that toward which the divergent arms project and also with a top board extending lengthwise of the press toward the pivoted support of the sweep.

6. A baling press provided with separate baling chambers spaced apart in the direction of the length of the press, and an elongated hopper common to both baling chambers, those ends of the hopper coinciding with the respective baling chambers having mountings adapting such ends of the hoppers to rise away from the respective baling chambers.

7. A baling press provided with separate baling chambers spaced apart in the direction of the length of the press, and an elongated hopper common to both baling chambers, those ends of the hopper coinciding with the respective baling chambers being separate from the intermediate portion of the hopper and adjacent to said intermediate portion pivoted to a fixed portion of the baling press, and spring members connected to the outer ends of the end portions of the hopper and yieldable to forces tending to move the hopper ends in a rising direction about the pivot supports.

In testimony, that I claim the foregoing as my own, I have hereto affixed my signature in the presence of two witnesses.

JOHN THOMAS McCUNE.

Witnesses:
   Mrs. C. A. McKisson,
   J. F. N. Huddleston.

Copies of this patent may be obtained for five cents each, by addressing the "Commissioner of Patents, Washington, D. C."